Patented Sept. 26, 1939

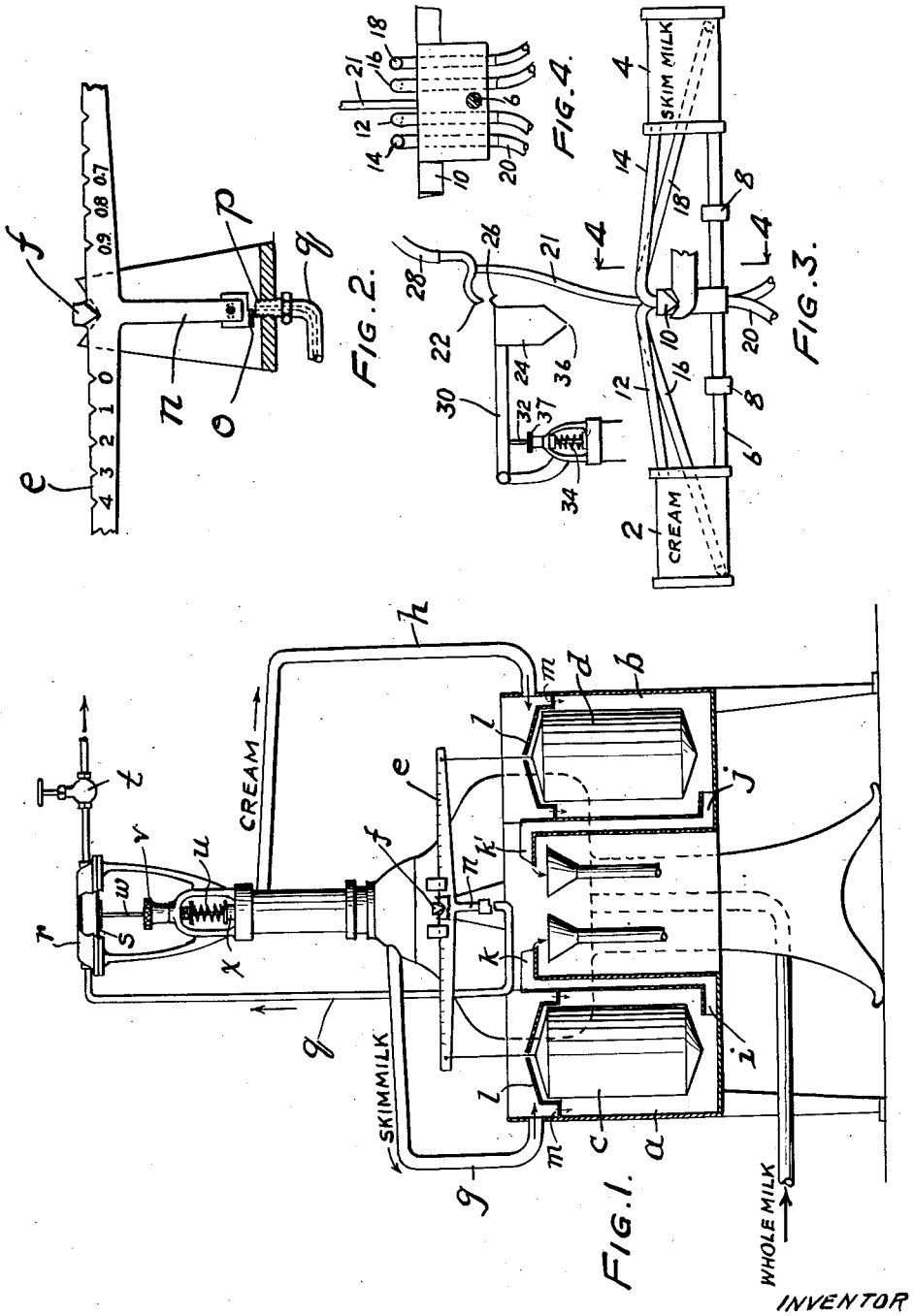

2,174,169

UNITED STATES PATENT OFFICE 2,174,169

CENTRIFUGAL SEPARATOR

Johannes Valdemar Mårten Risberg, Sodertalje, Sweden, assignor to The De Laval Separator Company, New York, N. Y., a corporation of New Jersey Application June 22, 1936, Serial No. 86,605
In Germany July 5, 1935

5 Claims. (Cl. 233—21)

In the separation of milk in a centrifugal separator provided with outlets which can be regulated from the outside, and from which the separated liquids discharge through closed pipe lines, a so-called "air-tight" separator, the fat content of the cream can be regulated during separation by changing the resistance in the one outlet pipe, and the fat content of the skim milk can be controlled by allowing a part of the cream to flow back into the skim milk pipe. In this way it is possible to produce continuously a milk of any desired fat content lower than the fat content of the whole milk fed into the separator. Thus, a milk suitable for cheese making having a fat content of e. g. 2.9% can be obtained by providing a regulating valve in the cream outlet and adjusting it to let through only the excess of cream. It is also possible to improve a milk of comparatively poor fat content to contain for instance 4% fat. In this case a quantity of skim milk is also produced, as byproduct, corresponding to the concentration, which is led away from the skim milk pipe by a branch pipe provided with a regulating valve.

In order that the regulation of the fat content shall be practically possible in continuous operation, it is however necessary to have the possibility of ascertaining instantaneously or at least very quickly the fat content of the milk or cream flowing out of the separator, which will enable the operator to make the necessary adjustment. The present invention relates to an indicator of the fat content based on the relation which according to natural law exists between the fat content of the milk and its specific gravity. The specific gravity of the milk depends both on its fat content and on the quantity of dry substance free from fat contained in the milk. The first of these reduces the specific gravity and the latter increases it. In order that the indicator shall react to a change in the fat content of the milk without simultaneously being influenced by a change which may possibly at the same time take place with its content of fat-free dry substance, it is necessary to neutralize this latter effect.

The principal object of the invention is to provide a device of the type just indicated, which will not only show the fat content of the milk, for the reasons indicated above, but may be arranged to automatically control the separation which takes place.

The above object and specific objects relating to details will be apparent from the following description read in conjunction with the accompanying drawing, in which—

Fig. 1 is a diagrammatic elevation, partly in section, showing a separator embodying the indicator of the invention, which is arranged to automatically control the operation.

Fig. 2 is an enlarged diagram showing details of the control arrangement.

Fig. 3 is a diagrammatic elevation with parts broken away and shown in outline only, illustrating a further modification of the invention; and Fig. 4 is a section taken on the plane indicated at 4—4 in Fig. 3.

The indicator according to the invention, which is shown in Fig. 1 of the accompanying drawing, consists of two cylindrical weights $c$ and $d$ of exactly the same size and the same weight and arranged respectively in cylinders $a$ and $b$, of which $a$ is designed to receive the practically fat-free skim milk from the separator and $b$ is intended for the standard milk or cream to be produced. The two weights $c$ and $d$ are suspended on fine wires from the arms of a beam $e$ which is supported at the middle by a knife $f$ about the edge of which it can swing. The points of suspension are at exactly the same distance from $f$. The arm is graduated, the left portion from 0 to 10 and the right one from 0.9 to 0, and is provided with movable weights corresponding to the graduations. The left hand weight is $=10$ times the right hand one, and also their weight should be in a certain relation to the volume of the weights $c$ and $d$. If the volume is 1000 cubic centimeters for each of them, and if the specific gravity of the milk is reduced by 0.0008 for each per cent of fat content, a weight of 8 grams at the mark 10 of the left hand portion of the arm and a weight of 0.8 gram at the mark 0 of the right hand portion of the arm will mean that the milk in cylinder $b$ must have exactly 10% higher fat content than that in $a$ in order that the beam $e$ shall occupy a horizontal position. As mentioned in the foregoing the weights $c$ and $d$ have exactly the same volume and weight. The latter is such that the weight just sinks in milk of the highest specific gravity that has to be considered, as for instance skim milk with maximum content of fat-free dry substance. A volume of 1000 cubic centimeters then corresponds to a weight of at least 1040 grams.

As the two weights counterbalance each other, the fat-free dry substance of the milk, which is the same in both cylinders, will have no influence on the position of the beam $e$ but it will only react to the different fat contents in the two cylinders.

The indicator is placed on a stand at the side of the separator and is connected with the pipes for the liquids flowing out therefrom at $g$ and $h$. From $i$ and $j$ outlets $k$ and $k'$ extend upwards to such height that the weights will always be completely immersed in milk. If it is desirable to produce a milk of higher fat content than the one delivered to a dairy, for instance containing 4% fat, the cream pipe of the separator is connected with the skim milk pipe. Between the point of connection and the separator the skim milk pipe is provided with a branch pipe fitted with a regulating valve which can be adjusted in such a manner that it allows exactly so much milk to pass through that the milk which is produced by mixing the rest of the milk with the cream contains 4% fat. To test this the skim milk pipe is connected by a narrow tube with the inlet $g$, and the pipe for the standardized milk with the inlet $h$ of the indicator. The latter is adjusted when the two cylinders are filled with skim milk or water, it being ascertained that complete equilibrium exists when the two movable weights are at 0. The left weight is then moved to 4. Now it is only necessary, with the aid of the said regulating valve, to take out so much skim milk that the arm of the indicator occupies its position of equilibrium, as this shows that the milk entering the cylinder $b$ has a fat content which is 4% higher than that of the milk flowing into the cylinder $a$.

When the fat content is to be tested, the indicator may be used either in the way that the milk inlets to the two cylinders are closed so that the throughflow ceases, or by allowing a suitable quantity of milk to flow continuously through the two cylinders. It is advisable to protect the upper ends of the weights against disturbing flows of liquid by the intermediate wall $l$ which all around is provided with a number of holes $m$ for the passage of the milk. The walls also have such a shape that they surround the upper ends of the weights with comparatively small play, and will therefore act as a kind of liquid brake, attenuating the vertical oscillations of the weights. The movement of the liquid in the two cylinders takes place from above downwards, and consequently the forces of friction, due to the friction of the liquid against the cylindrical walls of the weights will counteract each other.

Another advantage of the two weights counteracting each other is that the stroke of the indicator on the whole is independent of changes in the temperature.

In the foregoing it has been described how the fat content of the standardized milk is controlled by a valve (not shown) operated by hand and regulated according to the stroke of the indicator. The device may, however, also be made automatic. For this purpose an auxiliary force, vacuum, is used, and the regulating valve consists of a so-called diaphragm valve of known construction. The construction of the valve is such that it is adjusted according to the vacuum acting on the diaphragm. When the air pressure is the same on both sides of the diaphragm, that is when there is no vacuum, the valve is kept closed by a spring. The vacuum chamber of the valve communicates through a pipe of small diameter with a small vacuum pump or the like, and is in known manner provided with a regulating screw, which is so throttled that the vacuum in the vacuum chamber and thus also the adjustment of the valve is influenced by the smallest supply of air into the vacuum chamber. The supply of air is controlled by the device shown in Fig. 2, which on a larger scale illustrates the beam $e$ of the indicator, here provided with a downwards directed arm $n$ having at its lower end an end piece $o$. The said end piece co-operates with the nozzle $p$, which communicates with the vacuum chamber of the regulating valve through pipe $q$. The nozzle, the outer end of which is provided with a fine thread, is adjusted in such manner that, when the arms $e$ and $n$ swing, the end piece moves close past its orifice without, however, touching it.

If a valve arrangement of the type described above is used, regulation now takes place in the following manner. It is assumed that the left movable weight, as before, is at the mark 4, Fig. 2, so that the arm swings downwardly at the left and the nozzle $p$ is closed. The vacuum in the vacuum chamber of the regulating valve thereby increases so much that the valve is completely opened and allows a too large proportion of the skim milk to pass through, if it controls the skim milk, or is closed to restrict the cream if it controls the latter. The fat content of the milk mixture entering the cylinder $b$ therefore becomes too high, the arm swings downward to the right and the nozzle $p$ is opened. So much air then enters the vacuum chamber that the spring can change the regulating valve correspondingly. After the arm thus has swung up and down some times it comes to rest in the position of equilibrium, and the fat content of the discharging milk becomes constant and equal to the one shown by the movable weight, provided that the degrees on the arm have been correctly marked out.

The controlling device is more fully shown in Fig. 1. The tube $q$ communicates with the chamber $r$ closed by a diaphragm $s$ and connected, through a valve $t$, with a vacuum pump. The cream throttle valve (if a cream valve is being controlled) is pressed toward the closed position by a spring $u$ having its tension adjusted by a screw with a knurled head $v$. The diaphragm $s$ is connected, through a rod $w$, with the member $x$ against which the spring presses. When air is exhausted from the space above the diaphragm, atmospheric pressure on the under side forces it up and pulls on the rod $w$, overcoming part of the pressure of the spring and allowing the throttle to open more readily. Air is exhausted from the space above the diaphragm by the connection to the pump, which is controlled by the valve $t$, while air is admitted to the chamber $r$ through the pipe $q$ at a rate controlled by the location of the end piece $o$ above the orifice $p$.

If the skim milk is valve-controlled, a corresponding, but reverse, action is provided.

In similar manner cheese milk having a fat content of, for instance 2.9%, is made. For this purpose the cream pipe from the separator, with the branch pipe referred to in the foregoing, is provided with a regulating valve. A corresponding quantity of skim milk is, as before, fed into the cylinder $a$ and of cheese milk into the cylinder $b$. The left weight should be at 2 and the right one at 0.9.

When the indicator is to be used for the standardization of cream, the fat content of which may be as high as 50%, the arm is provided with a corresponding scale of degrees and with movable weights.

In Figs. 3 and 4 there is shown still another modified arrangement. In this modification two chambers, 2 and 4, are carried by a beam 6 on which are mounted movable weights 8, the beam being supported by a knife edge 10. In order to provide for a completely closed air-tight system, the inlet pipes 16 and 18 and outlet pipes 12 and 14, communicating with the chambers, are connected, through flexible tubes 20, to the separator and delivery conduit in any suitable fashion. The flexible connections are preferably arranged close to the knife edge so as to offer little resistance to tilting of the beam. It will be obvious that manipulation of the sliding weights will arrange for the attainment of equilibrium when predetermined liquids are passed through the chambers 2 and 4. To provide for automatic control, the beam 6 carries an arm 21, which, at its upper end, supports an orifice member 22 arranged to discharge liquid either into or outside a cup 24, depending upon the position of the orifice 22 to the left or right of a deflecting member 26. The liquid may be supplied to the orifice 22 through a light flexible tube 28 which may, if desired, have its connection made adjacent the knife edge if extreme sensitivity is desired.

The cup 24 is carried by the beam 30 arranged to press on a rod 32, which in turn presses on the same member as the spring 34 and adds its force to that due to the tension of the spring, which is adjustable by a screw with a knurled head 37. The valve operated by the spring may control either the cream or the skim milk. The cup 24 is provided at its lower end with a small opening 36.

The operation of the arrangement of Fig. 3 will be obvious. As the beam swings clockwise, the liquid from the orifice 22 will miss the cup and, if liquid were previously in it, it will gradually flow out through the opening 36 and relieve the pressure on the control valve. On the other hand, if the beam swings in a reverse direction, liquid will be discharged from 22 into the cup at a greater rate than that at which it escapes through the opening 36 and the added weight will increase the pressure on the control valve, thus securing the desired regulation.

The advantages of the arrangement of Fig. 3 are that complete enclosure may be provided, whereas in the float arrangement of Fig. 1 the upper ends of the weights c and d are necessarily exposed to atmosphere. In the arrangement of Fig. 3 any desired pressure may be maintained on the skim milk and cream passing through the closed containers.

It is not essential, in either modification, that flow should occur through both chambers. For example, chamber 4 in Fig. 3 might be provided with a liquid of such specific gravity that the composition of the cream in chamber 2 would be automatically maintained constant even though it was not balanced against skim milk. Preferably, however, the arrangement is such as shown for the reasons indicated in the introduction to the specification.

What I claim and desire to protect by Letters Patent is:

1. The combination with a cream separator having closed outlets for both cream and skim milk of fat content controlling means comprising two elements on opposite ends of a balanced arm, one being responsive to the weight of a certain constant volume of skim milk and the other to a certain constant volume of cream, weights adjustable to cause an unbalance equal and opposite to that of the difference between skim milk and cream of the desired fat content and means responsive to the movements of the balanced arm due to variation in the relative weights of said constant volumes arising from change of fat content to effect a corresponding change in the proportions of the outflowing liquids, thereby enabling the fat content of the cream to be predetermined and maintained constant.

2. The combination with a cream separator having closed outlets for both cream and skim milk and having a tendency to discharge an excessive quantity of liquid from the cream outlet thereby making a cream of low fat content, of fat content controlling means comprising an adjustable throttling valve on the cream outlet, a balanced arm, an element responsive to the weight of a predetermined volume of skim milk connected to one end of the arm, an element responsive to the weight of an equal volume of cream connected to the other end of the arm, adjustable means to cause an unbalance of the arm equal and opposite to that of the predetermined volumes of skim milk and cream of the desired fat content and means responsive to the movements of the balanced arm to gradually open the throttle when the cream contains excessive fat and gradually close the throttle when the cream contains too little fat.

3. The combination with a separator having a plurality of outlets for the separated constituents, of a device to maintain a predetermined quality of one of said constituents constant comprising means controlling at least one of said outlets, and means comprising two elements on opposite ends of a balanced beam, one being responsive to the weight of a certain constant volume of one constituent and the other to the weight of a certain constant volume of another constituent, whereby changes in the relative weights of said constant volumes tend to cause movement of said beam and weights adjustable to cause an unbalance corresponding to a predetermined difference between the specific gravities of the two constituents.

4. The combination with a cream separator having closed outlet passages for cream and skim milk, of chambers through which the separated cream and skim milk are adapted to respectively discharge, a balanced arm, an element responsive to the specific gravity of the skim milk in one of said chambers connected to the end of said arm, an element responsive to variations in the specific gravity of the cream in the other of said chambers connected to the other end of said arm, whereby any change in one direction of the specific gravity of the cream will move said arm, and means responsive to any movement of said arm to so change the relative rates of flow of the separated liquids and thereby so change the specific gravity of the cream in the opposite direction as to return the arm to its original position, whereby the specific gravity and hence the fat content of the cream are maintained substantially constant.

5. The combination with a cream separator having closed outlets for cream and skim milk, of chambers through which the separated cream and skim milk respectively discharge and which are filled with said liquids during the operation of the separator, a balanced arm from opposite ends of which said chambers are suspended, whereby any change in one direction in the specific gravity of the cream will move said arm, and means responsive to any movement of said arm to so change the relative rates of flow of the separated liquids and thereby so change the specific gravity of the cream in the opposite direction as to return the arm to its original position, whereby the specific gravity and hence the fat content of the cream are maintained substantially constant.

JOHANNES VALDEMAR
MÅRTEN RISBERG.